UNITED STATES PATENT OFFICE.

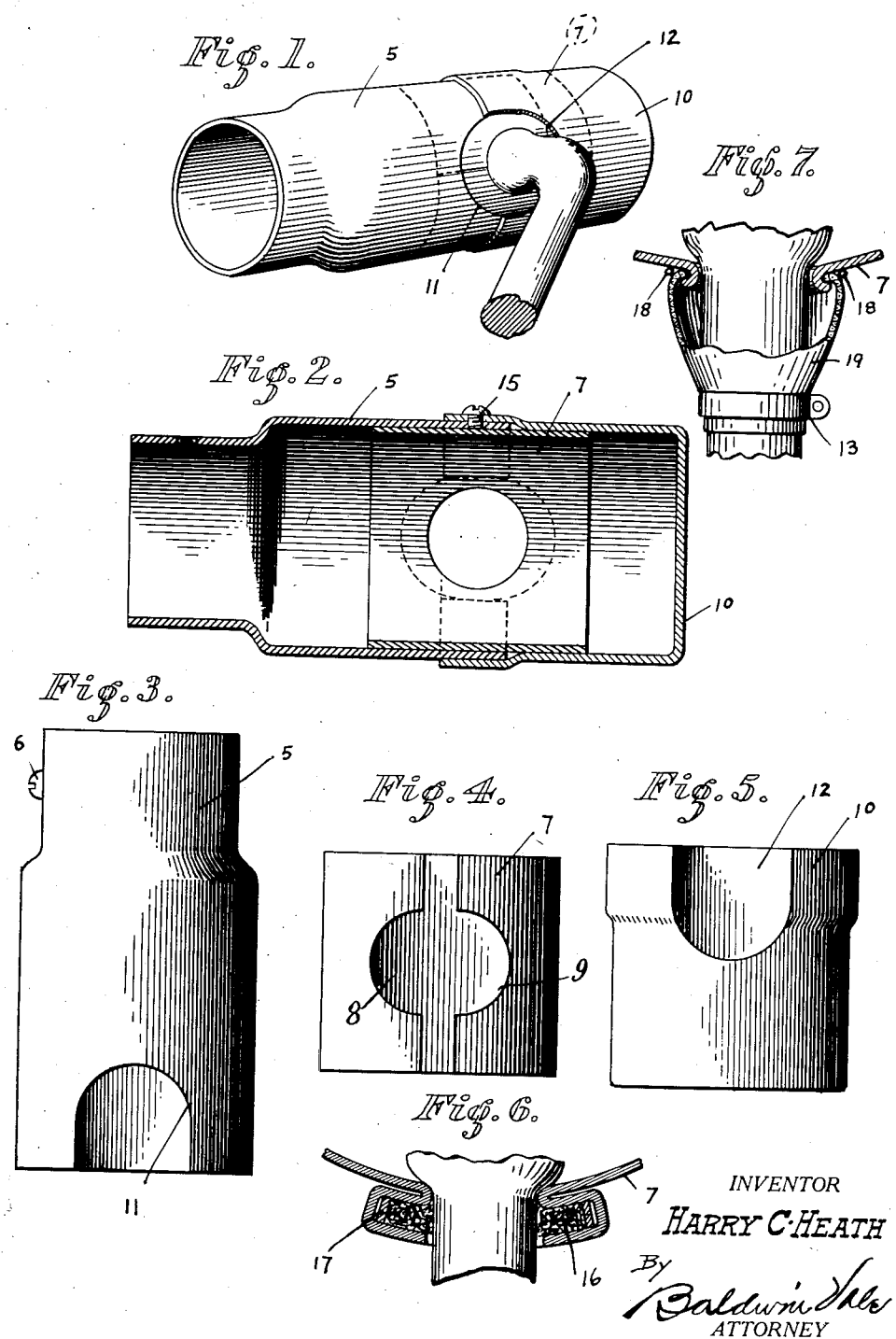

HARRY C. HEATH, OF SAN FRANCISCO, CALIFORNIA.

LUBRICATOR.

1,350,075.  Specification of Letters Patent.  Patented Aug. 17, 1920.

Application filed March 31, 1919. Serial No. 286,224.

*To all whom it may concern:*

Be it known that I, HARRY C. HEATH, a citizen of the United States, and a resident of the city and county of San Francisco, State of California, have made a new and useful invention—to wit, Improvement in Lubricators; and I do hereby declare the following to be a full, clear, concise, and exact description of the same.

This invention relates to a lubricator adapted to not only lubricate, but also to protect the part being lubricated from dust, dirt and the excess wear caused by the same getting into the lubricant used in exposed places.

My device is particularly adapted to be used on the ball joint of an automobile steering rod, but it is to be understood that the same may be used in any place where a ball joint should be either lubricated or protected.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

Referring to the drawings which accompany and are a part of this specification,

Figure 1 is a perspective view of my assembled device showing a steering arm projecting out of the same.

Fig. 2 is a longitudinal cross section of Fig. 1.

Figs. 3, 4 and 5 show the three parts of my preferred form of lubricator protector.

Figs. 6 and 7 show modified forms of my invention.

Like numerals refer to corresponding parts in all views of the drawing.

The numeral 5 designates the major part of my lubricator, and is adapted to be placed over the steering arm of an auto or upon any other device of similar character, which will act as a support for the same. Any well known means may be employed for rigidly securing said part 5 upon its support, such as a screw 6. Partly within the member 5, I place a split member 7. This member is provided with cut-away semi-circular portions adjacent the split and forming a circular opening in said member which allow for the passage of a ball carrying member. This member 7 can freely rotate and slide in the member 5.

The numeral 10 designates a cup-shaped portion adapted to fit snugly over the end of the member 5 and thereby inclose the freely moving member 7. Portions of the members 5 and 10 are cut away as at 11 and 12 to allow for the free movement of the ball carrying member projecting through the opening in the member 7.

In assembling my device, I first place the member 5 upon the steering arm or like part, then spread the member 7 so as to pass the split portion over the ball carrying member after which the member 5 can be slipped over one end of the member 7 and the screw or other fastening means tightened. Lubricant should be packed into the open end of the part 7 and the cup portion 10 partly filled and forced over the part 7 and onto the part 5 where it will be held by strong frictional engagement upon the member 5, or may be held in fixed position by a screw as shown at 15.

If desired a felt or other similar washer 16 may be attached to the sides of the cut-away portions 8 and 9 in the member 7, as shown in Fig. 6 and held in close contact with the steering arm by a flat band spring 17. This construction will prevent the loss of any amount of lubricant. When the ball carrying member is of peculiar construction which will not permit of a close adjustment of the member 7, a short boot 19 of leather or the like, may be clamped with the wire 18 to the part 7 which should then have a suitable lug formed as shown at Fig. 7, the other end of the said boot is then to be clamped to the ball carrying member as by the clamp 13.

Reference is herein made to my copending application Serial 304,428, filed June 16, 1919.

Having thus described my invention, what I claim as new and desire to secure by Letters Patent is:

1. In a protector for a ball and socket joint, in which said ball is mounted with a shank and said socket is contained within a tubular member; a two-part sleeve recessed to admit of the free movement of said shank, and means for securing said sleeve to said tubular member; a concentric member constructed and adapted to slide between the said sleeve and the said tubular member and split and recessed to fit the said shank.

2. In a protector for a ball and socket joint, in which said ball is mounted with a shank and said socket is contained within a tubular member; a two-part sleeve recessed to admit of the free movement of said shank, and means for securing said sleeve to said tubular member; a concentric member constructed and adapted to slide between the said sleeve and the said tubular member and split and recessed to fit the said shank, and packing means between said concentric member and said shank.

3. In a protector for a ball joint, said joint having also a ball shank and a tubular member inclosing a socket, said protector comprising a spring metal sleeve, and oil sealing means including packing surrounding said shank and affixed to the spring metal sleeve, and an inclosing sheath fixed with said tubular member, the spring metal sleeve mounted with sliding engagement between said tubular member and said sheath.

In testimony whereof, I have hereunto set my hand at San Francisco, California, this 20th day of March 1919.

HARRY C. HEATH.

In presence of—
A. J. HENRY.